US008867334B2

(12) United States Patent
Dharwadkar et al.

(10) Patent No.: US 8,867,334 B2
(45) Date of Patent: *Oct. 21, 2014

(54) EFFICIENT CONVERGENCE OF GROUPED VPN PREFIXES (75) Inventors: Pranav Dharwadkar, San Jose, CA (US); Yuri Tsier, Kanata (CA); Clarence Filsfils, Brussels (BE); John Bettink, San Jose, CA (US); Pradosh Mohapatra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 13/338,980

(22) Filed: Dec. 28, 2011

(65) Prior Publication Data
US 2012/0099420 A1 Apr. 26, 2012

Related U.S. Application Data (63) Continuation of application No. 12/130,345, filed on May 30, 2008, now Pat. No. 8,121,032.

(51) Int. Cl.
*G06F 11/00* (2006.01)
*H04L 12/26* (2006.01)
*H04L 12/28* (2006.01)
*H04L 12/56* (2006.01)
*G06F 11/16* (2006.01)
*H04L 12/46* (2006.01)

(52) U.S. Cl.
CPC .................................. *H04L 12/4641* (2013.01)
USPC .......... 370/216; 370/255; 370/409; 714/4.11; 714/4.2

(58) Field of Classification Search
CPC . H04L 29/14; H04L 41/0631; H04L 41/0654; H04L 41/0659; H04L 45/22; H04L 45/28; H04L 49/354; H04L 63/0273; G06F 11/0793; G06F 11/0703; G06F 11/20; G06F 11/2035
USPC ........... 370/216–218, 236, 255, 395.53, 221, 370/254, 397, 399, 409; 714/2, 3, 4.1, 4.2, 714/4.21
See application file for complete search history.

(56) References Cited

U.S. PATENT DOCUMENTS

| 6,339,595 | B1 | 1/2002 | Rekhter et al. |
| 6,463,061 | B1 | 10/2002 | Rekhter et al. |
| 6,526,056 | B1 | 2/2003 | Rekhter et al. |
| 6,970,464 | B2 | 11/2005 | Xu et al. |
| 7,307,990 | B2 | 12/2007 | Rosen et al. |

(Continued)

*Primary Examiner* — Un C Cho
*Assistant Examiner* — Jeremy Costin
(74) *Attorney, Agent, or Firm* — Novak Druce Connolly Bove + Quigg LLP (57) ABSTRACT In one embodiment, a list of border node next hop options is maintained in a memory. The list of border node next hop options includes one or more of border nodes that may be utilized to reach one or more prefixes. An index value is associated with each border node of the list of border node next hop options. A list of labels is also maintained in the memory. The index value of each border node is associated with a corresponding label for a path to reach that border node. When a change to the one or more border nodes is detected, the list of border node next hop options is updated to remove a border node. However, a label for the path to reach the border node is maintained in the list of labels for at least a period of time.

20 Claims, 7 Drawing Sheets

(56) References Cited

U.S. PATENT DOCUMENTS

| | | |
|---|---|---|
| 7,318,108 B2 | 1/2008 | Sreekantiah et al. |
| 2002/0097680 A1 | 7/2002 | Liu et al. |
| 2006/0209682 A1 | 9/2006 | Filsfils et al. |
| 2006/0215579 A1 | 9/2006 | Nadeau et al. |
| 2007/0110025 A1 | 5/2007 | Guichard et al. |
| 2007/0248091 A1 | 10/2007 | Khalid et al. |
| 2008/0084880 A1* | 4/2008 | Dharwadkar ............... 370/392 |
| 2008/0084881 A1* | 4/2008 | Dharwadkar et al. ......... 370/392 |

* cited by examiner

EFFICIENT CONVERGENCE OF GROUPED VPN PREFIXES

RELATED CASES

This Application is a continuation of U.S. patent application Ser. No. 12/130,345 entitled "Efficient Convergence of Group VPN Prefixes", filed on May 30, 2008 by Pranav Dharwadkar et al., the contents of which are incorporated by reference herein in their entirety.

TECHNICAL FIELD

The present disclosure relates generally to prefix convergence in computer networks.

BACKGROUND

Commonly, network devices operate one or more routing/forwarding protocols, such as the Border Gateway Protocol (BGP), that associate a destination address prefix ("prefix") with a particular next-hop node ("next-hop") from the network device. In order to send traffic (e.g., packets) to the prefix, the network device sends the traffic to the associated next-hop, which may continue (e.g., "hop-by-hop") to the destination. A BGP next-hop, for example, is generally the next BGP node that is to be used to reach the particular prefix (which may require first traversing one or more interior next-hops on the way to the BGP next-hop). In addition, as will be understood by those skilled in the art, virtual private networks (VPNs) may be used to segment the network into a plurality of "private" networks that may be used to differentiate traffic traversing shared/common links. For instance, for a particular network (e.g., a provider network), multiple border nodes may advertise reachability for the same VPN prefix, where each border node associates a different VPN label used to reach the destination VPN prefix.

The network device often stores its routing information in a routing table (e.g., using information in a BGP table and other sources, such as interior gateway protocols, or IGPs) that is a searchable data structure in which prefixes are mapped to their associated routing information (e.g., next-hops) and their associated labels. In particular, for use with VPN prefixes, multiple corresponding virtual routing/forwarding (VRF) instances may be used, as will be understood by those skilled in the art. As the routing information changes, the routing tables (and/or VRF instances) are updated accordingly. Moreover, the routing tables may also be used to create a forwarding table or "Forwarding Information Base" (FIB), which the network device uses to forward the traffic. Changes to the routing tables, therefore, may eventually propagate into the FIB to effectuate a forwarding change.

Often, the time to add, modify, or delete entries in a routing table is a belabored process. For instance, each prefix in a routing table is generally linked to a particular next-hop as a tightly bound pair. When the next-hop is changed for a particular prefix, the prefix must be "re-linked" to the new next hop. On a singular basis, this may not be especially burdensome. However, when a substantially large number of prefixes populate the routing tables (e.g., 400-800K VPN prefixes), and where a single next-hop change (e.g., due to next-hop failure, modification, or other topology change) applies to a large number of those prefixes, the per-prefix re-linking/updating ("convergence") may require a substantial amount of time, which is often unacceptable. Further, because of the time required to complete the convergence, traffic may be lost until the FIB has been properly updated to reflect the change in the network topology (e.g., sending traffic to a failed next-hop node).

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, one or more virtual private network (VPN) prefixes may be grouped at a network node into sets having shared network border node next-hop options, where each border node has a defined index value associated therewith. Also, a list of VPN labels associated with each VPN prefix may be maintained by the network node, where each VPN label is associated with a border node of a particular set by a corresponding index value.

Also, according to embodiments of the disclosure, the network node may determine a particular border node for traffic to be forwarded, along with the defined index value. The network node may then apply the index value to select an associated VPN label, and may affix the selected VPN label to the traffic for forwarding. In this manner, should a change to the border node next-hop options be detected, the border node next-hop options for the set may be efficiently converged based on the change.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
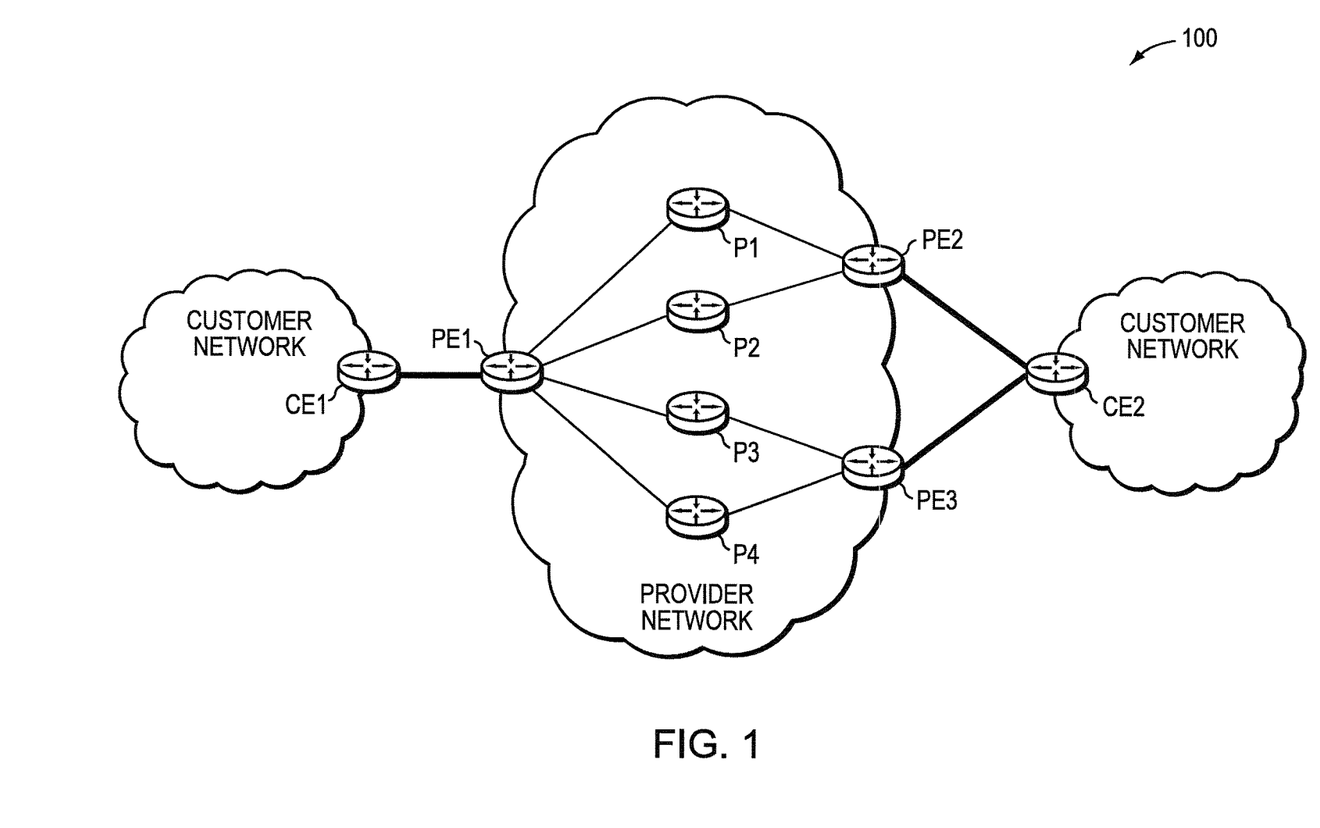
FIG. 1 illustrates an example computer network.

FIG. 1 is a schematic block diagram of an exemplary computer network 100 illustratively comprising nodes (e.g., routers) interconnected by one or more links as shown. For instance, customer edge (CE) nodes CE1 and CE2 may be interconnected via a provider network having provider edge (PE) nodes PE1 (interconnected with CE1) and PE2 and PE3 (both interconnected with CE2). Further, provider (P) nodes P1 and P2 may interconnect PE1 and PE2 over alternate paths, while P3 and P4 may interconnect PE1 and PE3 over alternate paths. Those skilled in the art will understand that any number of nodes, routers, links, paths, etc. may be used in the computer network, and that the view shown herein is for simplicity. Those skilled in the art will also understand that while the present invention is described generally, it may apply to any network configuration within an AS or area, or throughout multiple ASes or areas, etc. For example, the present invention may be used with a customer/provider network configuration as shown, or with other configurations as will be understood by those skilled in the art. Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
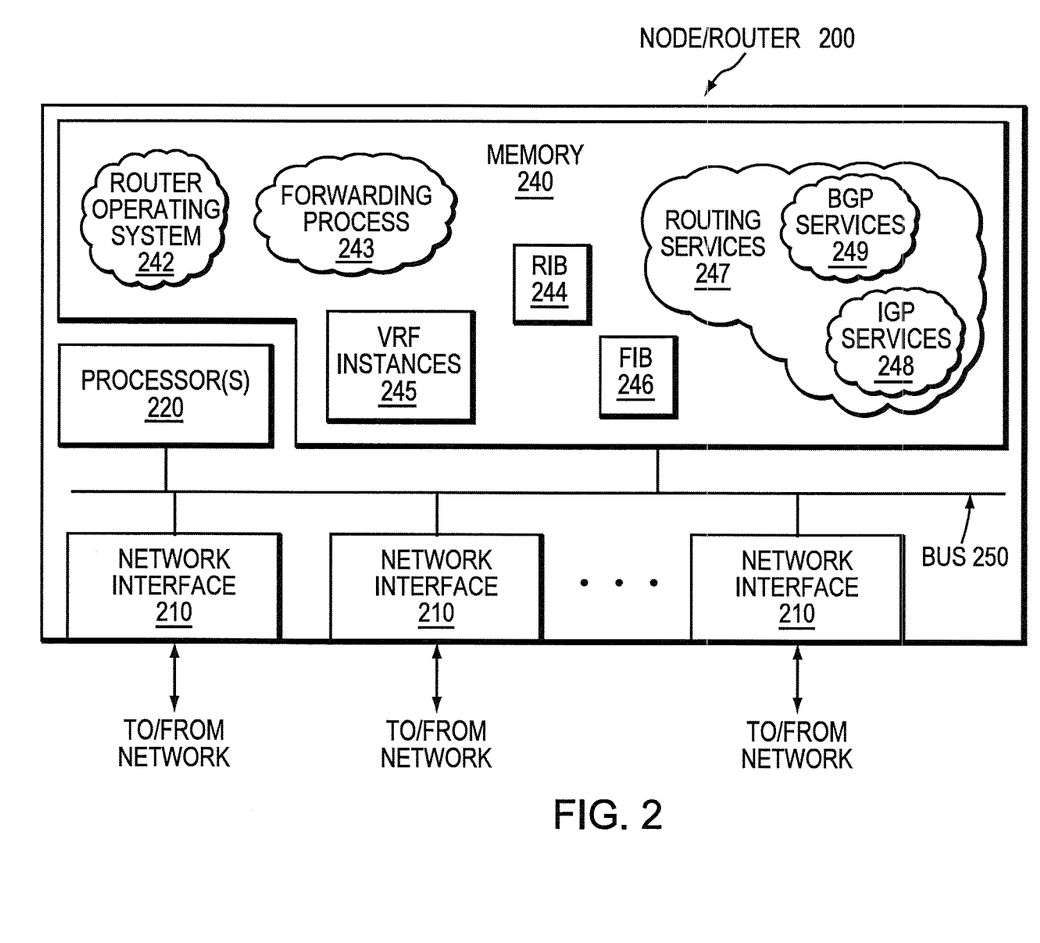
FIG. 2 illustrates an example network device/node.

FIG. 2 is a schematic block diagram of an exemplary node/router 200 that may be advantageously used with one or more embodiments described herein, e.g., as a network device as used herein. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processors 220 may comprise necessary elements or logic adapted to execute the software programs and manipulate the data structures, e.g., routing table(s)/Routing Information Base (RIB) 244, forwarding tables/Forwarding Information Base (FIB) 246, and/or VRF (Virtual Routing and Forwarding) instances 245. A router operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, forwarding process 243, and other services/processes not shown. It will be apparent to those skilled in the art that other techniques and devices, including various computer-readable media, may be used to store and execute program instructions pertaining to the inventive technique described herein.

Routing services 247 contain computer executable instructions that may be executed by each processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP process 248, the Border Gateway Protocol (BGP) as BGP process 249, etc., as will be understood by those skilled in the art. These functions may be configured to manage RIB 244 and, in conjunction with forwarding process 243, FIB 246 containing, e.g., data used to make forwarding decisions, as will be understood by those skilled in the art. In particular, changes in the network topology may be communicated among routers 200 using routing protocols, such as the conventional OSPF and IS-IS link-state protocols or BGP (e.g., to "converge" to an identical view of the network topology). Notably, routing services 247 may also perform functions related to virtual routing protocols, such as maintaining VRF instances 245 as will be understood by those skilled in the art. In particular, where the network 100 is configured for VPNs, each node within the network may maintain one or more VRF instances 245, generally described as a separately maintained routing table for each corresponding VPN. VRF instances offer many benefits (VPN-based differential routing), but may increase the memory utilization of each device by requiring the additional storage of virtual routing tables, as may be appreciated by those skilled in the art.

In particular, BGP (e.g., version 4) is a well-known example of an interdomain routing protocol, which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers (BGP speakers or BGP nodes) typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session.

An intermediate network node (network device) often stores its routing information in a routing table or RIB 244. (Notably, a RIB is sometimes referred as the process that manages the routing table, however, routing table and RIB are used interchangeably herein). The RIB is a searchable data structure in which network addresses are mapped to their associated routing information, and, as will be understood by those skilled in the art, may be used to populate a forwarding table or FIB 246 that is used by the node to make forwarding decisions. Those skilled in the art will understand that the RIB/FIB need not be organized as a table, and alternatively may be another type of searchable data structure. Although the intermediate network node's RIB may be configured with a predetermined set of routing information, the node also may dynamically acquire ("learn") network routing information as it sends and receives data packets (e.g., using one or more BGP and/or IGP Advertisements). When a packet is received at the intermediate network node, the packet's destination address may be used to identify a routing table entry containing routing information associated with the received packet. Among other things, the packet's routing information indicates the packet's next-hop address.

BGP route selection, as described herein, may utilize a distance vector (Bellman-Ford) algorithm or, more specifically, a BGP best path selection (path vector) algorithm, or a "best BGP path selection algorithm". According to the BGP standard, every BGP router announces to all of its peers the routes it uses for its own forwarding. As a result of these announcements (i.e., BGP advertisements), a particular router may gather from its peers two or more routes for some networks. For example, the router may have learned two or more different ways to reach a particular destination prefix, and the best BGP path selection computation is a way of choosing one of those routes as "best" and using it to render forwarding decisions for the router (i.e., the best route is installed into the routing table).

Illustratively, given the network configuration in FIG. 1, assume that CE2 advertises reachability for one prefix, "prefix_1", to both PE2 and PE3. PE2 and PE3 may both in-turn advertise this prefix to PE1 with VPN labels "VPN_1" and "VPN_2", respectively. That is, each border node (e.g., BGP speaker) allocates an MPLS (Multi-Protocol Label Switching) label per prefix and includes this label with the prefix advertisement messages. In this manner, as may be appreciated by those skilled in the art, traffic received by PE1 that is destined to prefix_1 may be transmitted to border nodes PE2 and PE3 with appropriate VPN labels, accordingly. Assuming that the internal paths to reach PE2 and PE3 within the provider network are equal cost paths ("equal cost multi-path" or ECMP), then the traffic may be load-balanced between PE2 and PE3. In addition, should traffic be sent to PE2, then the traffic may be further load-balanced between either P1 or P2, while traffic to PE3 may be further load-balanced to either P3 or P4 (again assuming equal cost paths).

Figure 3:
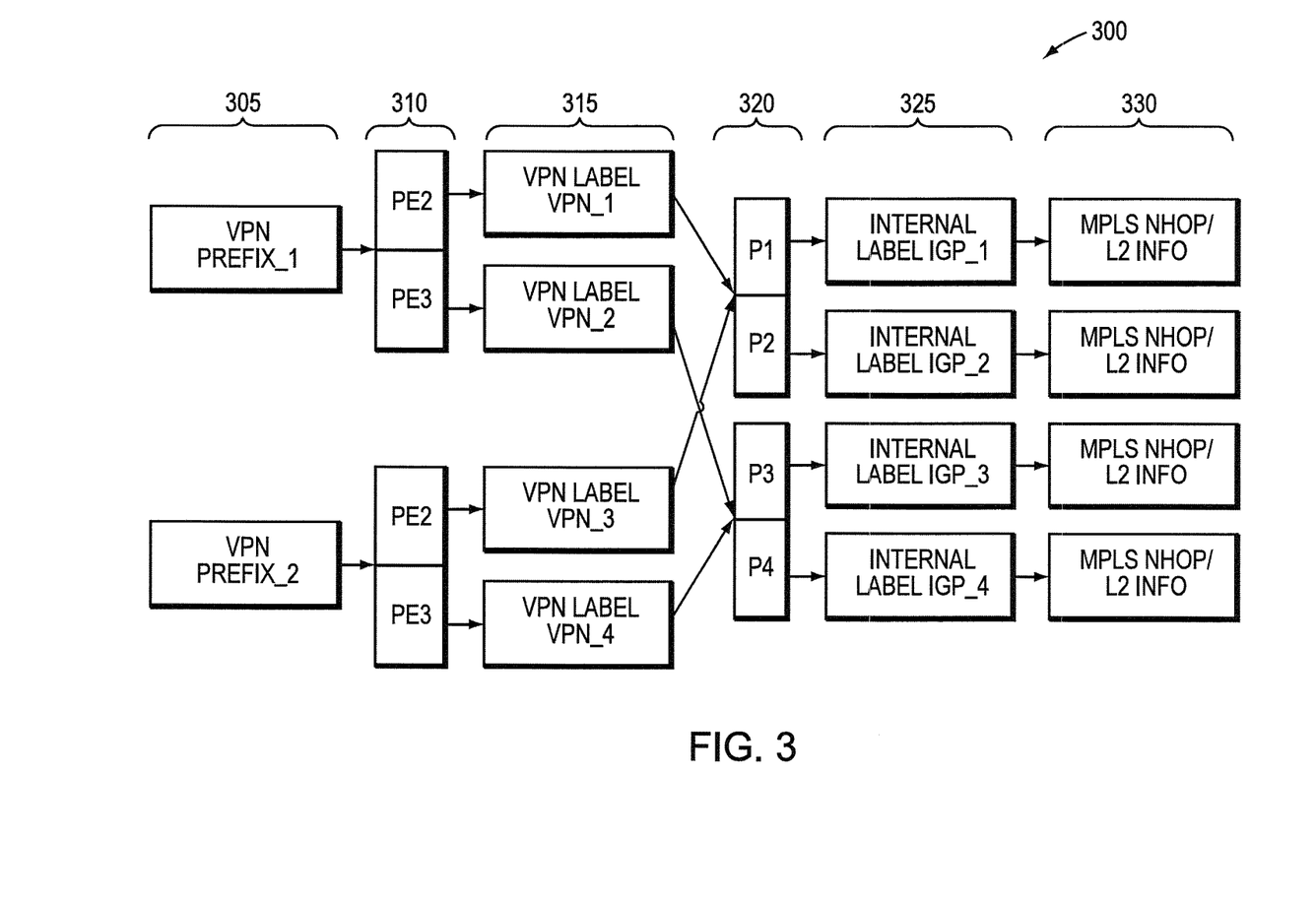
FIG. 3 illustrates an example representation of a forwarding chain for VPN prefixes.

FIG. 3 illustrates an example representation of a forwarding chain 300 of a conventional arrangement as may be utilized by ingress border node, e.g., PE1, in accordance with the network 100 of FIG. 1. In particular, VPN prefixes 305, such as prefix_1 (above) and an additional illustrative VPN prefix, "prefix_2", each begin a portion of the chain 300 (traversed in the direction of arrows, e.g., from left to right). To reach each VPN prefix (1 and 2), PE1 may utilize either PE2 or PE3 as border node next-hops (egress border nodes) 310, for instance, load balancing between the two (e.g., as determined through a hashing algorithm or otherwise). In the case of VPN prefix_1, if PE2 is used, then a corresponding VPN label 315, VPN_1 as advertised by PE2, is used, while in the case where PE3 is used, then a corresponding label VPN_2, as advertised by PE3, is used. Similarly, for VPN prefix_2, depending on whether PE2 or PE3 is used, corresponding VPN labels "VPN_3" and "VPN_4" may be used.

Once the outgoing border nodes and corresponding VPN labels for the VPN prefix are determined, internal paths 320 (internal to the provider network) to the border nodes may then be selected. For example, in reaching PE2 from PE1, paths via either P1 or P2 may be used, which may illustratively correspond to an internal (IGP) label 325, such as "IGP_1" or "IGP_2", respectively, along with associated MPLS next-hop/L2 information 330, as may be appreciated by those skilled in the art. Also, in reaching PE3 from PE1, paths via either P3 or P4 may be used, which may illustratively correspond to an internal (IGP) label "IGP_3" or "IGP_4", respectively, again along with associated MPLS next-hop/L2 information. (Note that because PE1 may reach either of PE2 or PE3 through a same internal path regardless of the VPN prefix or VPN label used, the internal paths may be shared among prefixes, such as a shared "path-list", where pointers indicate the particular path-list to use.)

In this manner, when PE1 receives traffic destined to a particular VPN prefix (e.g., prefix_1), that particular prefix is used as an entry into the forwarding chain 300, from which a border node next-hop may be selected (e.g., PE2) and used to determine an appropriate VPN label (e.g., VPN_1) to affix to the traffic. Also once the border node next-hop is selected, an internal path to reach the border node is chosen (e.g., P1), and an appropriate IGP label (e.g., IGP_1) and L2 information may also be affixed to the traffic, allowing the traffic to be forwarded through the network 100 according to the selected path from the forwarding chain 300.

Notably, in the provider network configuration shown in FIG. 1, the points of failure between CE1 and CE2 may be one of the following three categories:

1. Core Failure—e.g., where either one of the links between PE1 and P1 fails, or the link between PE1 and P2 fails, or router P1 or P2 fails, etc. (P3 and P4);
2. Edge Failure—e.g., where either PE2 or PE3 fails or otherwise becomes unreachable; and
3. Per-VRF Edge Failure—e.g., where the link between PE2 and CE2 fails, or the link between PE3 and CE2 fails.

In the event of a core failure, using the shared path-list technique mentioned above, convergence time is limited to the time required to adjust the affected IGP path-lists. However, in the event of an edge failure or per-VRF edge failure, each prefix entry in the forwarding chain 300 is impacted, and is required to re-converge (e.g., each prefix entry removing the failed edge/border node from its chain). As an example, there may be 2000 customers behind CE2, and the total number of VPN prefixes that PE1 learns from PE2 and PE3 (for CE2) could be on the order of 400K to 800K prefixes. Convergence time for this may be measured from 2-4 minutes, which is proportional to the number of prefixes. Thus, if the number of prefixes were greatly increased (e.g., tripled), then the convergence time would also be greatly increased (e.g., tripled).

Efficient Convergence of Grouped VPN Prefixes

According to embodiments of the disclosure, output path information (border node next-hop options, e.g., VPN load-info) is disassociated from output path attributes (VPN labels), and the border node next-hop options (output paths) are shared among all VPN prefixes (e.g., across VRF instances) that have the same output paths, thus allowing for prefix independent convergence.

Figure 4:
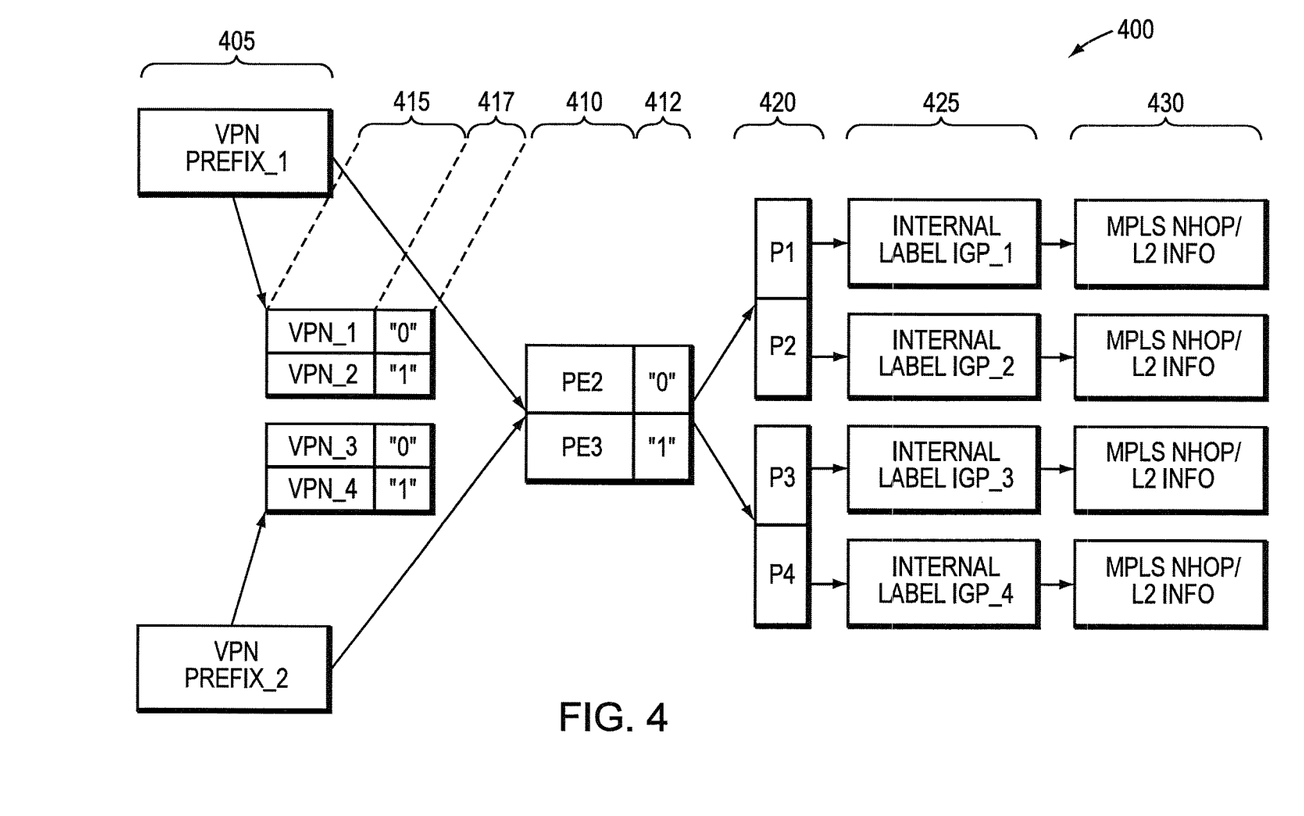
FIG. 4 illustrates an example representation of a forwarding chain for VPN prefixes for efficient convergence of grouped VPN prefixes.

Operationally, one or more VPN prefixes may be grouped at a network node (e.g., PE1) into sets having shared network border node next-hop options (e.g., PE2 and PE3). FIG. 4 illustrates an example representation of a forwarding chain 400 in accordance with one or more embodiments described herein. In particular, VPN prefixes 405 (e.g., prefix_1 and prefix_2) may be grouped into a set that share border node next-hop options 410 (shared VPN loadinfo), in this example, PE2 and PE3. For instance, a VPN prefix 405 may be linked to a set (e.g., a "BGP path-list") if it shares the same list of border node next-hop options (notably, or the same list of primary border node next-hop options and secondary border node next-hop options, as described herein below). In accordance with the embodiments herein, each shared border node has a defined index value 412 associated therewith, for instance "0" for PE2, and "1" for PE3 (e.g., as defined by the network device, PE1).

Also, a list of VPN labels 415 associated with each VPN prefix may be maintained by the network node, where each list is referenced only by each corresponding VPN prefix. In other words, border nodes (PE2 and PE3) still advertise VPN labels in the same manner as described above, however, the VPN labels may now be stored separately from the border node next-hop options to allow for border node sharing (e.g., BGP path-list sharing). Specifically, each VPN label list may be referenced by each corresponding VPN prefix, and each VPN label within the list may be associated with an appropriate border node of the set by a corresponding index value 417. For example, when PE2 advertises VPN prefix_1 and it's associated VPN label VPN_1, PE1 may store an entry for prefix_1 to PE2 in the chain 400, and may add an index value (e.g., 0) to PE2 that corresponds to the index value (e.g., 0) stored with the VPN label VPN_1. Similarly, the remaining prefixes, VPN labels, and border nodes may be updated. For instance, if PE2 also advertised prefix_2, PE1 would realize that another VPN prefix has been advertised by PE2, and thus would add prefix_2 to the shared forwarding chain 400. Since PE2 is already associated with an index value of "0", then the VPN label VPN_2 for prefix_2 may be referenced by prefix_2 at an index value of "0" as well.

Said differently, each border node next-hop option for any prefix 405 from the network device (e.g., PE1) is given a unique index value 412, and may be stored in a shared list of border node next-hop options 410. For each prefix learned by the network device, the associated VPN label 415 is referenced by the prefix (notably, not by the particular border node), and is associated with an index value 417 that matches the index value of the corresponding (advertising) border node.

Referring again to FIG. 3 above, VPN labels 315 were referenced within a portion of the chain 300 dedicated to a particular prefix 305, and a particular border node 310, thus resulting in many instances of the border nodes that would be impacted during convergence. However, as seen in FIG. 4 (and as described below), should any of the border nodes 410 become unreachable (e.g., node/link failure), then the convergence simply involves updating the shared border node list, which is vastly more efficient than updating each border node instance as would be the case in FIG. 3.

Forwarding of traffic according to embodiments of the disclosure may also be performed in a different manner based on the forwarding chain 400 of FIG. 4. Specifically, the network node (PE1) may receive traffic destined for a particular VPN prefix (e.g., prefix_2), and may determine a particular border node for the traffic to be forwarded. For example, as mentioned above, where there exists a plurality of border node next-hop options (e.g., PE2 and PE3), the network device may load balance the traffic to each of the plurality of network border node next-hop options, or determine which border node to use in other manners. Once the border node is selected, the corresponding index value 412 may be determined, and applied to the VPN label list 415 to select an associated VPN label based on the label index values 417. For instance, if PE3 were selected having index value of "1", then PE1 may determine that for VPN prefix_2, an index value of "1" corresponds to VPN label VPN_4, i.e., the appropriate label for sending prefix_2 traffic to PE3. The network device may then affix the selected VPN label to the traffic for forwarding, accordingly.

In this manner, the ingress/forwarding node (PE1) first selects the border node (BGP) next hop for the VPN prefix, then based on the index value of the selected next-hop, chooses an appropriate VPN label associated with the VPN prefix for that next-hop. Notably, prior to forwarding the traffic with the affixed VPN label, the forwarding node may also determine an internal path of the particular border node (e.g., load-balanced from a plurality of internal path options), over which the traffic may be forwarded. For instance, once the border node is selected, the forwarding chain 400 may be traversed to select a particular internal path 420 (e.g., P1 or P2 for PE2, P3 or P4 for PE3), which may then correspond to associated internal labels, such as IGP labels 425 and MPLS/L2 information 430, which may also be affixed to the traffic prior to forwarding.

Figure 5:
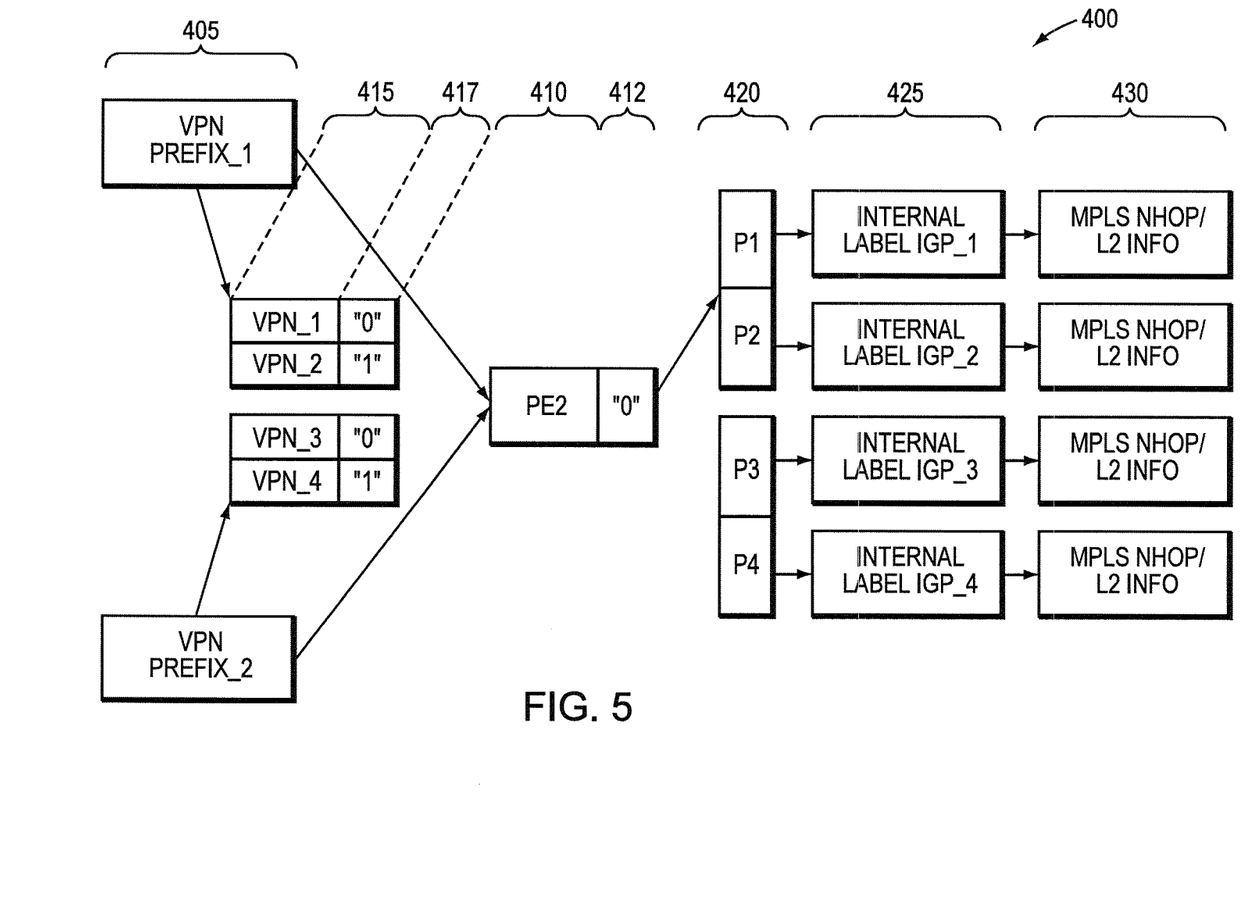
FIG. 5 illustrates another example representation of a forwarding chain for VPN prefixes for efficient convergence of grouped VPN prefixes.

In addition, should a change to the border node next-hop options be detected, the border node next-hop options for the set may be efficiently converged based on the change. For example, FIG. 5 illustrates an example representation of the forwarding chain 400 after determining that a border node next-hop option (e.g., PE3) is unreachable. For instance, as mentioned above, once PE3 becomes unreachable (e.g., fails), the shared border node list (VPN loadinfo) 410 is updated to indicate the number of paths is reduced by one (e.g., removing PE3 or otherwise indicating its unreachability), and convergence is complete. The VPN label list/array 415 need not be touched, and would still contain labels for all paths, including the failed path. However, as noted, those labels for which no path exists would simply be unused until a later time when either the unreachable border node becomes reachable, or until the label is removed, e.g., during a background process that has no effect on convergence time. In this manner, convergence time is independent of the number of VPN prefixes, and would remain the same irrespective of the size of the VPN tables (VRF instances 245).

In particular, utilizing the embodiments described herein may greatly reduce the number of memory accesses and amount of computation required to repair and/or modify redundant path scenarios when there are many more (e.g., orders of magnitude more) prefixes than next-hops. Also, the embodiments allow for fast updates of next-hops and associated paths without disrupting the forwarding of traffic, and further allow for fast failure protection. Specifically, updates may include, inter alia, deleting next-hops, changing next-hops due to failure detection, modifying next-hops in place, etc., for path-lists that have multiple and/or redundant paths (next-hops) to the set of grouped prefixes. Again, notably, each of these updates/changes may occur quickly with substantially no traffic loss using the novel events described herein, while leaving any slower convergence to occur when timing may be less critical (e.g., after forwarding of traffic over an alternate path has been established). For example, upon deletion of the FIB entry (FIB 246) for a specific border node next-hop, any corresponding sets of border node next-hop options 410 may be updated to no longer use the related next-hop (and, thus, its associated label 415 via the index 412). This data-plane protection/convergence does not scale with the number of prefixes sharing the shared list 410, and hence "hides" any loss caused by a slower control-plane convergence (which is per-prefix).

Illustratively, the network device (PE1) forwards traffic bound for each of the prefixes in the group based on an ECMP (equal cost multipath) arrangement by selecting from a plurality of next-hop options, or as a primary/secondary path configuration (e.g., ECMP or uni-path). That is, for ECMP, a selected next-hop path may be chosen (load balanced) from each of the next-hop options of the group of VPN prefixes (e.g., PE2 or PE3). In a primary/secondary path configuration, however, a primary path list (e.g., an ECMP path list or a uni-path list with one option) may be used until, for example, a failure of each next-hop option in the primary path list. At such a time, the primary path list is removed, and the network device may begin to forward traffic bound for each of the prefixes in the group based on a secondary next-hop path list (e.g., assuming a secondary next-hop path list is available). In other words, so long as the primary set of paths is not empty, the secondary/alternate set is not used for forwarding. (Notably, a prefix may share a border node next-hop list if it shares both the primary and secondary portions of the list.)

For example, assume that FIG. 5 alternatively illustrates an example of a primary/secondary path list arrangement, where the primary path list (410) only comprises a uni-path option, PE2. As can be seen, prior to a failure, the VPN label array 415 may comprise two indexes 417, "0" and "1", corresponding to PE2 and PE3 as described above. However, in the primary/secondary arrangement (e.g., where PE2 is a "better" option than PE3) only index "0" is used for the primary path list (PE2) until PE2 fails. At this time, the path list 410 may be replaced by the secondary path list (e.g., PE3, another uni-path list), and the index 412 for "1" may now be applied to the labels 415 (index 417) to select the VPN label corresponding to the secondary border node next-hop option. (In this manner, the secondary path list becomes a "primary" path list, as no other path list contains better options from which to select a next-hop border node.) Accordingly, the primary and secondary path lists may be interchanged based on network topology changes (e.g., failure of primary options), but there would be no change to the list of VPN labels 415.

Figure 6:
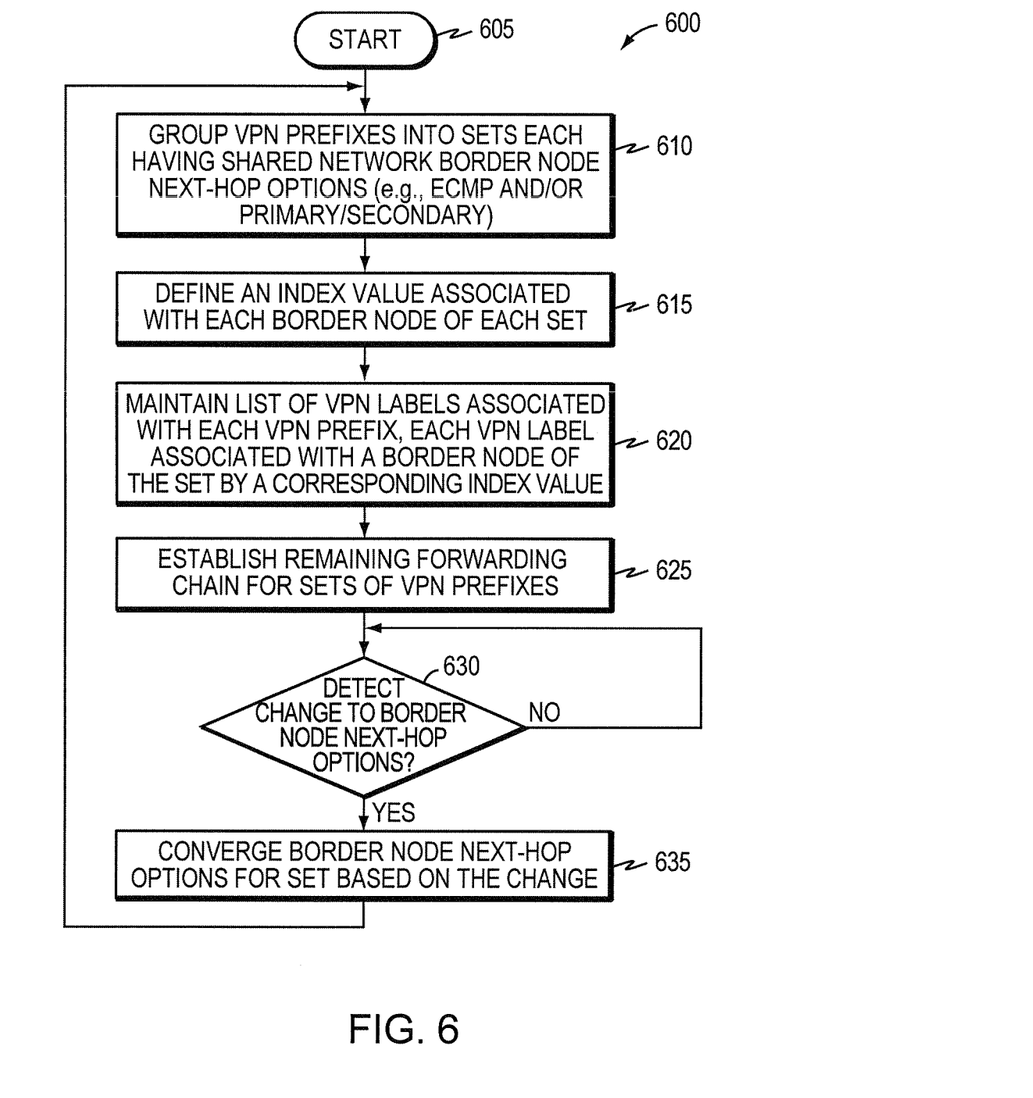
FIG. 6 illustrates an example procedure for efficient convergence of grouped VPN prefixes.

FIG. 6 illustrates an example procedure for use with efficient convergence of grouped VPN prefixes in accordance with one or more embodiments described herein. The procedure 600 starts at step 605, and continues to step 610, where a network device (e.g., a forwarding process 243 of PE1) groups a set of VPN prefixes 405 (e.g., prefixes 1-2) according to shared network border node next-hop options 410 (e.g., BGP next-hops PE2 and PE3, such as in an ECMP arrangement, or a primary/secondary ECMP or uni-path arrangement, as described herein). In step 615, the network device may define an index value 412 associated with each border node of each set (e.g., 0 or 1 for PE2 and PE3, respectively). Further, in step 620, a list of VPN labels associated with each VPN prefix is maintained (list 415), where each VPN label is associated with a border node of the set by a corresponding index value 417. For example, as mentioned above, VPN label VPN_1 is associated with index value "0" corresponding to the index value of border node PE2. The remaining portions of the forwarding chain 400 may be established in step 625, such as the internal (IGP/MPLS) portions, e.g., such as through group path-lists for the group of prefixes as described above (420-430).

If in step 630 a change is detected to a border node next-hop option (e.g., a failure of a next-hop option), then the border node next-hop options are converged for the set in step 635 based on the change (e.g., data-plane convergence). For instance, a failed/unreachable option may be removed, e.g., as described in FIG. 5 above, and/or a primary path list may be interchanged with a secondary path list, also as described above. Similarly (though not shown), any changes to internal routes (IGP/MPLS), such as the path-lists or explicit link information, may be made within the shared forwarding chain 400 as necessary. In particular, in accordance with the convergence of the forwarding chain, the procedure 600 may return to step 610 to maintain the grouped prefixes and the associated forwarding chains accordingly (e.g., for addition or other changes to next-hop options, such as for control-plane convergence in step 635).

Figure 7:
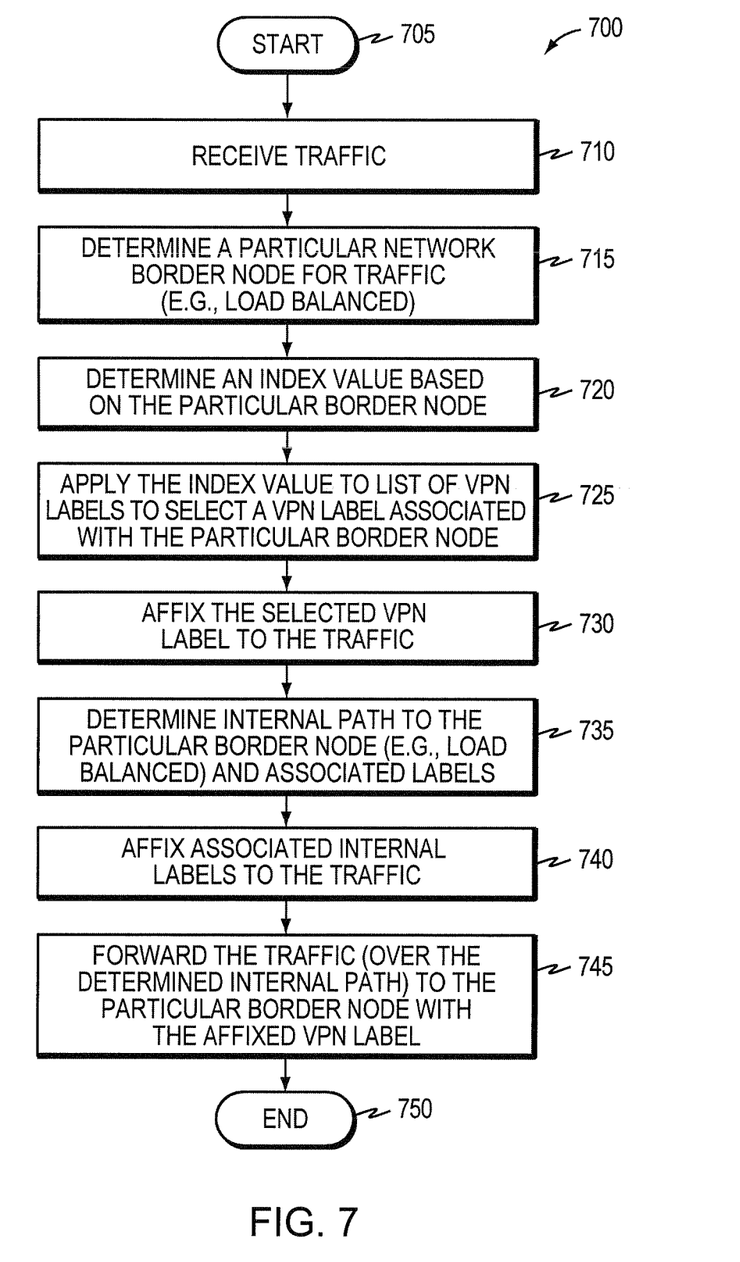
FIG. 7 illustrates another example procedure for efficient convergence of grouped VPN prefixes.

FIG. 7 illustrates an example procedure for use with efficient convergence of grouped VPN prefixes in accordance with one or more embodiments described herein, illustratively using the forwarding chain maintained in procedure 600 of FIG. 6. The procedure 700 starts at step 705, and continues to step 710, where a network device (e.g., the forwarding process 243 of PE1) receives traffic having a destination address prefix (e.g., VPN prefix, prefix_1). From the prefix, the network device may determine in step 715 a particular network border node (next-hop option) for the traffic, such as by looking up the prefix 405 in the forwarding chain 400 (e.g., a primary chain, if in a primary/secondary configuration). Assuming, as in FIG. 4, that multiple next-hop options 410 exist, various techniques may be used to distribute (e.g., load balance) the traffic to the options. Based on the particular border node chosen in step 715 (e.g., PE3), the network device may determine an index value 412 in step 720, and in step 725 may apply the index value to the list of VPN labels 415 for that prefix (prefix_1) to select a VPN label associated with the particular border node for the particular prefix to which this packet is destined (e.g., VPN label VPN_2, based on index 417). This label may then be affixed to the traffic in step 730. Notably, internal paths to the particular border node and associated labels may also be determined (e.g., load balanced) in step 735 as described above (e.g., via P1 or P2), and the associated internal labels may also be affixed to the traffic in step 740 (portions 420-430 of chain 400). The traffic may then be forwarded in step 745 over the determined internal path to the particular border node with the affixed VPN label (and any internal labels), and the procedure 700 ends in step 750.

Notably, as described herein, while per-prefix control-plane convergence may take a substantial amount of time, the data-plane techniques described herein essentially "hide" the convergence time associated with per-prefix next-hop processing. This is done by allowing traffic to be forwarded over an alternate/second path without waiting for the per-prefix convergence to complete, particularly by simply having only one index value available, i.e., the VPN labels for the prefixes that were to utilize the unreachable next-hop are simply never selected (no index value corresponds to that VPN label).

Advantageously, the novel techniques described herein efficiently manage the forwarding of traffic to VPN prefixes with shared border node next-hops in a computer network. By forwarding VPN prefix traffic based on shared path-lists and by disassociating the VPN labels from the shared path-lists, the novel techniques allow for fast convergence and path modification without addressing each VPN prefix individually. Particularly, convergence may occur in less than 250 ms in typical service provider networks, where the convergence is simply updating the shared BGP path-list. Further, memory usage may be reduced by the minimization of table entries (and the sharing of information across VRF instances), e.g., where the number of shared BGP path-lists scales with the number of unique sets of (primary set, backup set).

While there have been shown and described illustrative embodiments that efficiently manage the forwarding of traffic to VPN prefixes with shared border node next-hops in a computer network, it is to be understood that various other adaptations and modifications may be made within the spirit and scope of the present invention. For example, the embodiments have been shown and described herein with/using VPN prefixes and labels, as well as BGP (and IGP). However, the embodiments described herein in their broader sense are not so limited, and may, in fact, be used with any appropriate routing protocols, as will be understood by those skilled in the art. For instance, in addition to VPNs, the embodiments described above may also be applicable to Virtual Private LAN Service (VPLS) and Virtual Private Wire Service (VPWS), e.g., signaled by BGP, as may be appreciated by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   maintaining a list of border node next hop options in a memory of a network device, the list of border node next hop options including one or more border nodes that may be utilized to reach one or more prefixes;
   maintaining a list of virtual private network (VPN) labels in the memory of the network device, the list of VPN labels including one or more labels for paths;
   determining that one or more prefixes share the one or more border nodes from the list of border node next hop options;
   associating an index value with each shared border node;
   associating the index value of each shared border node of the list of border node next hop options with a corresponding VPN label of the list of VPN labels for a path to reach that border node;
   receiving traffic associated with a prefix of the one or more prefixes;
   determining, using the prefix, a particular border node for the traffic from the one or more shared border nodes;
   determining the index value based on the particular border node;
   applying the index value to select a VPN label from the list of VPN labels;
   applying the selected VPN label to the traffic;
   detecting a change to the one or more shared border nodes that may be utilized to reach the prefix;
   in response to the detecting, updating the list of border node next hop options to remove a border node from the list of border node next hop options, while maintaining a VPN label for the path to reach the border node in the list of VPN labels for at least a period of time;
   forwarding, by the network device, the traffic associated with the prefix by determining a second particular border node for the traffic from the one or more shared border nodes, determining a second index value associated with the second particular border node and applying the second index value to the list of VPN labels to determine a particular VPN label for the traffic.

2. The method of claim 1, wherein the change to the one or more shared border nodes is a failure of the border node.

3. The method of claim 1, wherein the change to the one or more shared border nodes is replacement of the one or more shared border nodes with one or more border nodes of a secondary list and the updating the list of border node next hop options comprises:
   replacing the list of border node next hop options with the secondary list.

4. The method of claim 1, wherein the one or more prefixes are virtual private network (VPN) prefixes.

5. The method of claim 1, wherein each border node of the list of border node next hop options represents a border gateway protocol (BGP) next-hop.

6. The method of claim 1, wherein the forwarding further comprises: affixing the particular VPN label to the traffic.

7. The method of claim 6, wherein the forwarding further comprises: determining an internal path to the second particular border node; and affixing an internal label associated with the internal path to the traffic, in addition to the particular VPN label.

8. The method of claim 7, wherein the internal label is an interior gateway protocol (IGP) label.

9. The method of claim 1, further comprising:
   removing the VPN label for the path to reach the border node from the list of VPN labels after the period of time.

10. The method of claim 1, wherein the change to the one or more shared border nodes is the border node becoming unreachable, and the method further comprises:
    maintaining the VPN label for the path to reach the border node in the list of VPN labels until the border node is again reachable.

11. The method of claim 1, wherein the network device is an ingress border node and the particular border node is an egress border node.

12. An apparatus comprising:
    one or more network interfaces configured to receive and forward traffic;
    a processor coupled to the network interfaces and configured to execute one or more processes; and
    a memory configured to store a forwarding process executable by the processor, the forwarding process when executed operable to:
    maintain a group of border node next hop options, the group of border node next hop options to include a plurality of border nodes that may be utilized to reach one or more prefixes,
    determine that one or more prefixes share the one or more border nodes from the list of border node next hop options;
    associate an index value with each shared border node;
    maintain a group of virtual private network (VPN) labels, the group of VPN labels to include a plurality of VPN labels for paths;
    associate the index value of each shared border node of the group of border node next hop options with a corresponding VPN label of the group of VPN labels for a path to reach that border node;
    receive traffic associated with a prefix of the one or more prefixes;
    determine, using the prefix, a particular border node for the traffic from the one or more shared border nodes;
    determine the index value based on the particular border node;

apply the index value to select a VPN label from the group of VPN labels;
apply the selected VPN label to the traffic;
detect a change to the shared border nodes that may be utilized to reach the prefix,
update the group of border node next hop options to remove a border node from the group of border node next hop options, while maintaining a VPN label for the path to reach the border node in the group of VPN labels for at least a period of time, and
forward the traffic associated with the prefix, by determination of a second particular border node for the traffic from the one or more shared border nodes, determination of a second index value associated with the second particular border node and application of the second index value to the group of VPN labels to determine a particular label for the traffic.

13. The apparatus of claim 12, wherein the forwarding process is operable to affix the particular label to the traffic.

14. The apparatus of claim 12, wherein the forwarding process is operable to update the group of border node next hop options by an indication the border node is unreachable.

15. The apparatus of claim 12, wherein the change to the shared border nodes is a failure of the border node.

16. The apparatus of claim 12, wherein the one or more prefixes are virtual private network (VPN) prefixes.

17. The apparatus of claim 12, wherein each border node of the group of border node next hop options represents a border gateway protocol (BGP) next-hop.

18. The apparatus of claim 12, wherein the forwarding process is further operable to:
    determine an internal path to the particular border node; and
    affixing an internal label associated with the internal path to the traffic.

19. The apparatus of claim 12, wherein the VPN label for the path to reach the border node from the group of VPN labels is removed after the period of time.

20. A non-transitory computer-readable medium encoded with software that when executed by a computer implements steps to:
    maintain a list of border node next hop options, the list of border node next hop options including one or more of border nodes that may be utilized to reach one or more prefixes;
    maintain a list of virtual private network (VPN) labels, the list of VPN labels including one or more VPN labels for paths;
    determine that one or more prefixes share the one or more border nodes from the list of border node next hop options;
    associate an index value with each shared border node;
    associate the index value of each shared border node of the list of border node next hop options with a corresponding VPN label of the list of VPN labels for a path to reach that border node;
    receive traffic associated with a prefix of the one or more prefixes;
    determine, using the prefix, a particular border node for the traffic from the one or more shared border nodes;
    determine the index value based on the particular border node;
    apply the index value to select a VPN label from the list of VPN labels;
    apply the selected VPN label to the traffic;
    detect a change to the one or more shared border nodes that may be utilized to reach the prefix;
    update the list of border node next hop options to remove a border node from the list of border node next hop options or to indicate a border node from the list of border node next hop options is unavailable, yet maintain a VPN label for the path to reach the border node in the list of VPN labels for at least a period of time after the update;
    forward the traffic associated with the prefix by determining a second particular border node for the traffic from the one or more shared border nodes, determining a second index value associated with the second particular border node and applying the second index value to the list of VPN labels to determine a particular VPN label for the traffic.

* * * * *